United States Patent [19]

Oinaga

[11] Patent Number: 4,665,479
[45] Date of Patent: May 12, 1987

[54] VECTOR DATA PROCESSING SYSTEM FOR INDIRECT ADDRESS INSTRUCTIONS

[75] Inventor: Yuji Oinaga, Tokyo, Japan
[73] Assignee: Fujitsu Limited, Kanagawa, Japan
[21] Appl. No.: 654,591
[22] Filed: Sep. 26, 1984
[30] Foreign Application Priority Data
Sep. 26, 1983 [JP] Japan ................. 58-177748
[51] Int. Cl.⁴ .............................. G06F 9/18
[52] U.S. Cl. .................... 364/200; 364/736
[58] Field of Search ... 364/200 MS File, 900 MS File, 364/736

[56] References Cited
U.S. PATENT DOCUMENTS
3,541,516 11/1970 Senzig ............................. 364/200
4,435,765 3/1984 Uchida et al. .................. 364/200

Primary Examiner—Archie E. Williams
Assistant Examiner—Michael J. Ure
Attorney, Agent, or Firm—Armstrong, Nikaido, Marmelstein & Kubovcik

[57] ABSTRACT

A vector data processing system includes at least an A-access pipeline (27) and a B-access pipeline (28) between a main storage unit (4) and vector registers (21). Associated with the A-access pipeline (27) are a write port (WA) and a read port (RA) selectively connected to the vector registers (21). Associated with the B-access pipeline (28) are a write port (WB) and a read port (RB) selectively connected to the vector registers (21). An additional read port (IA) is linked between the read port (RB) of the B-access pipeline (28) and the address input side of the A-access pipeline (27). When an indirect address load/store instruction is carried out for the A-access pipeline (27), an indirect address is generated from the vector registers (21) via the read port (RB) of the B-access pipeline (28) and the additional read port (IA).

6 Claims, 14 Drawing Figures

| NUMBER OF VECTOR REGISTERS | 256 | 128 | 64 | 32 | 16 | 8 |
|---|---|---|---|---|---|---|
| ELEMENTS PER ONE VECTOR REG. | 16 | 32 | 64 | 128 | 256 | 512 |

Fig. 5

| BANK | NO.0 | NO.1 | NO.2 | NO.3 | NO.4 | NO.5 | NO.6 | NO.7 |
|---|---|---|---|---|---|---|---|---|
| ELEMENTS (1st) | 0 | 1 | 2 | 3 | 4 | 5 | 6 | 7 |
| ELEMENTS (2nd) | 8 | 9 | 10 | 11 | 12 | 13 | 14 | 15 |
| — — — | | | | | | | | |
| ELEMENTS (1024th) | | | | | | | | 4095 |

VECTOR DATA PROCESSING SYSTEM FOR INDIRECT ADDRESS INSTRUCTIONS

BACKGROUND OF THE INVENTION

1. Field of the Invention

The present invention relates to a high speed digital computer adapted for vector processing, and more particularly, to a vector data processing system in which indirect address instructions can be carried out.

2. Description of the Prior Art

Recently, to provide more rapid processing, vector computers have been developed. In one example of the prior art, the vector computer comprises a plurality of vector registers, and a plurality of pipelines such as access pipelines, an add operation pipeline, a multiply operation pipeline, a division operation pipeline, and a mask pipeline. In such a vector computer, data of a main storage unit is loaded via one of the access pipelines in the vector registers, and vector operation is carried out by supplying two operand vectors to one of the operation pipelines to obtain a result vector, which is again written into the vector registers. Then, the final result vector is stored from the vector registers via one of the access pipelines in the main storage unit, thereby completing one data processing sequence. That is, the access pipelines are used for carrying out load instructions and store instructions.

There are two kinds of load/store instructions, i.e., direct address load/store instructions and indirect address load/store instructions. Here, in a direct address load/store instruction mode, addresses are supplied from a vector instruction control circuit directly to the access pipelines, while in an indirect address load/store instruction mode, addresses are supplied by the vector instruction control circuit from the vector registers to the access pipelines.

When carrying out a direct address load instruction for transmitting data from the main storage unit to the vector registers, only one access is necessary for the vector registers, and therefore, only one write bus is necessary for each access pipeline. Similarly, when carrying out a direct address store instruction for transmitting data from the vector registers to the main storage unit, only one access is necessary for the vector registers, and therefore, only one read bus is necessary for each access pipeline. Thus, one write bus and one read bus are necessary for each access pipeline to perform direct address instructions.

When carrying out an indirect address load instruction for transmitting data from the main storage unit to the vector registers, two accesses, i.e., one access for generating an indirect address and one access for loading data in the vector registers, are necessary for the vector registers, and therefore, one read bus and one write bus are necessary for each access pipeline. Similary, when carrying out an indirect address store instruction for transmitting data from the vector registers to the main storage unit, two accesses, i.e., one access for generating an indirect address and one access for storing data in the main storage unit, are necessary for the vector registers, and therefore, two read buses are necessary for each access pipeline. Thus, two read buses and one write bus are necessary for each access pipeline to perform indirect address instructions.

Thus, to perform indirect address load/store instructions, one additional read bus is necessary for each access pipeline, and therefore, two additional read buses are necessary for the two access pipelines. Obviously an increased number of access pipelines will require additional read buses. Such additional read buses make necessary an increase of the multiplexity of interleaves of the vector registers, thereby increasing the manufacturing cost of the vector computer.

SUMMARY OF THE INVENTION

It is an object of the present invention to provide a vector data processing system having a plurality of access pipelines in which indirect address load/store instructions are carried out without increasing the multiplexity of interleaves of vector registers.

According to the present invention, in a vector data processing system comprising at least an A-access pipeline and a B-access pipeline between a main storage unit and vector registers, a write port and a read port selectively connected to the vector registers are associated with the A-access pipeline and a write port and a read port selectively connected to the vector registers are associated with the B-access pipeline. An additional read port is linked between the read port of the B-access pipeline and the address input side of the A-access pipeline. As a result, when an indirect address load/store instruction is carried out for the A-access pipeline, an indirect address is generated from the vector registers through the read port of the B-access pipeline and the additional read port.

That is, when an indirect address load/store instruction is carried out, only the read port and the additional read port are operated on the side of the B-access pipeline, and the additional read port transmits such an indirect address to the address input side of the A-access pipeline. In this case, the B-access pipeline itself is not used.

Thus, since the additional read port for generating indirect addresses is connected to the read port of the B-access pipeline, it is unnecessary to connect the additional read port directly to the vector registers, thereby requiring no increase of the multiplexity of interleaves of the vector registers.

BRIEF DESCRIPTION OF THE DRAWINGS

The present invention will be clearly understood from the description as set forth below with reference to the accompanying drawings, wherein:

FIGS. 2A and 2B, together comprising FIG. 2, shows a block diagram of a computer system incorporating the vector data processing system according to the present invention;

FIGS. 8A and 8B, together comprising FIG. 8, shows a detailed block diagram of the access pipelines of FIG. 2;

DESCRIPTION OF THE PREFERRED EMBODIMENTS

Figure 1A:
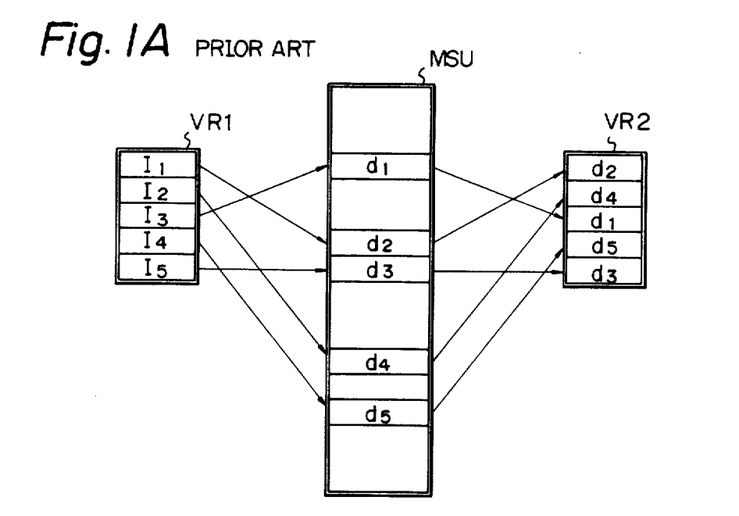
FIGS. 1A and 1B are diagrams for explaining the execution of indirect address instructions in the prior art.
Figure 1B:
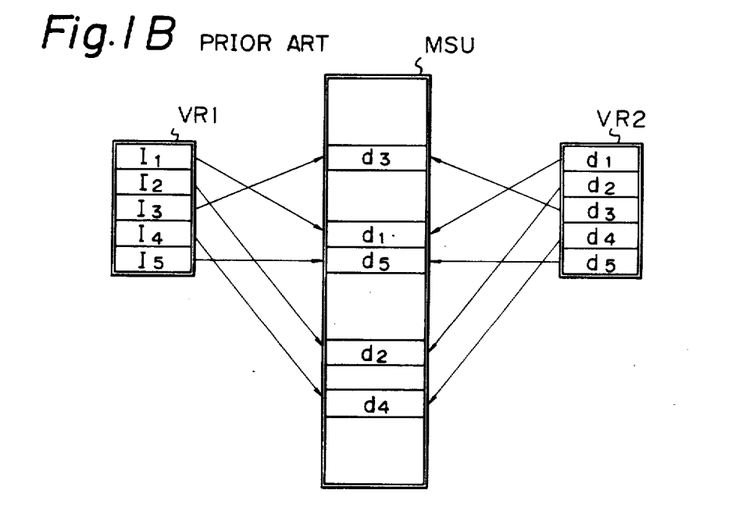

The execution of indirect address load/store instructions in the prior art will be briefly explained with reference to FIGS. 1A and 1B. In FIGS. 1A and 1B, reference VR1 designates a vector register for indirect addresses, i.e., elements $I_1, I_2, \ldots, I_5$; VR2 a vector register for data elements $d_1, d_2, \ldots, d_5$; and MSU a main storage unit. In FIG. 1A, when an indirect address load instruction is carried out, the elements $I_1, I_2, \ldots, I_5$ are sequentially read out of the vector register VR1. A base address is then added to each read element $I_i$ ($i=1, 2, \ldots, 5$), and an address transformation is performed upon the result of the addition to provide a real address. Finally, the main storage unit MSU is read out sequentially by the real addresses, so that read data elements $d_1, d_2, \ldots, d_5$ are written into the vector register VR2. In FIG. 1B, when an indirect address store instruction is carried out, the elements $I_1, I_2, \ldots, I_5$ are also sequentially read out of the vector register VR1, and the addition of a base address and an address transformation is performed upon the read element $I_i$ ($i=0, 1, \ldots, 5$) to provide a real address. The elements $d_1, d_2, \ldots, d_5$ are then written by the real addresses into the main storage unit MSU.

Figures 2, 2A:
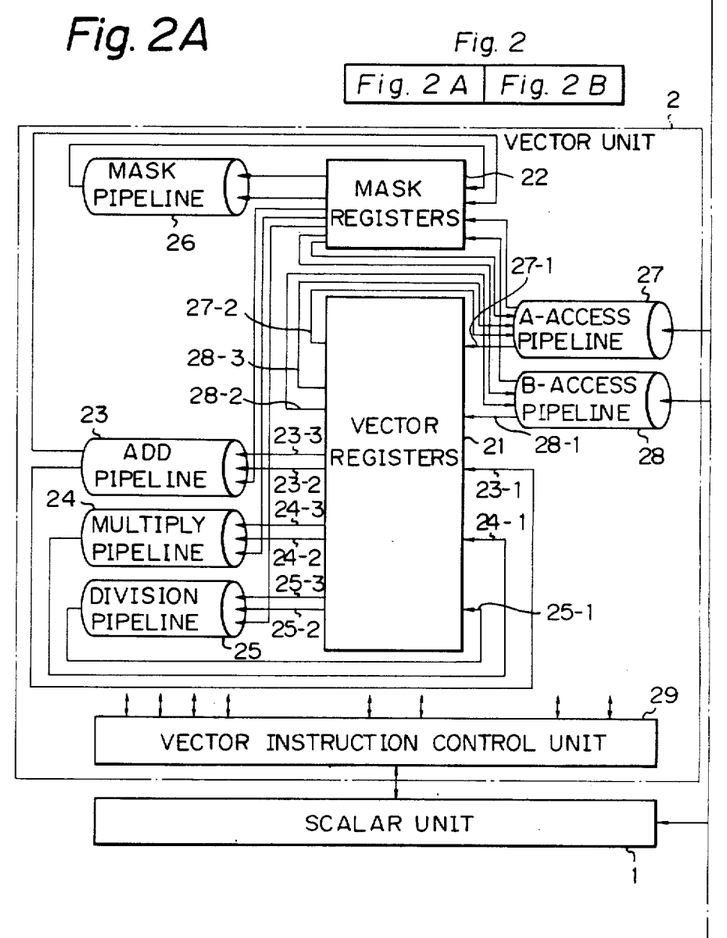
Figure 2B:
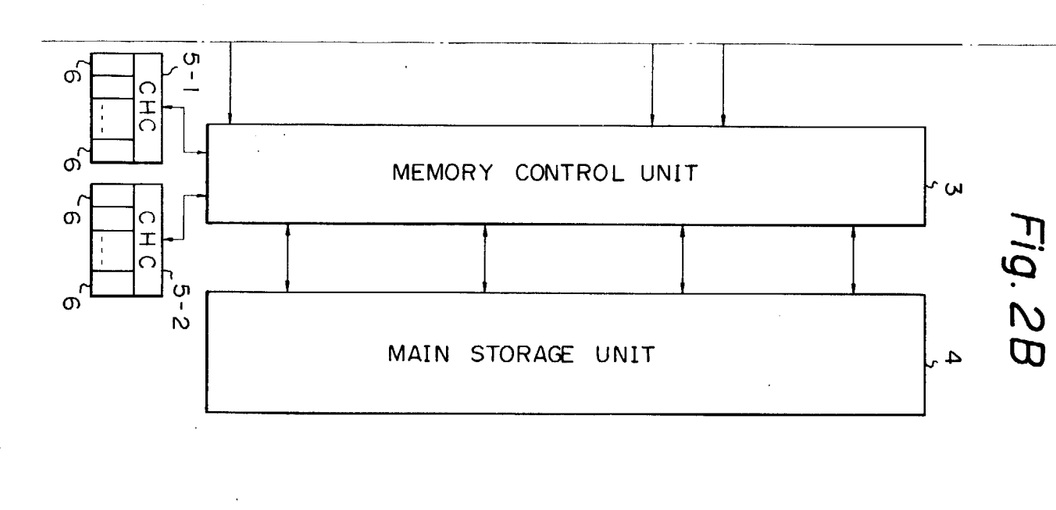

In FIG. 2, which is a block diagram of a computer system incorporating the vector data processing system according to the present invention, this system is comprised of a scalar unit 1, a vector unit 2, a memory control unit 3, a main storage unit 4, channel control units 5-1 and 5-2, and channels 6. The scalar unit 1 comprises a program status word (PSW) register, control registers, general registers, floating point registers, and the like, to read and decode all the instructions. As a result, the scalar unit 1 recognizes instructions as scalar instructions, and such scalar instructions are carried out in the scalar unit 1. Alternatively, if the scalar unit 1 recognizes instructions as vector instructions, such vector instructions including instruction codes, addresses, and operands are delivered to the vector unit 2 which executes the vector instructions.

Note that the scalar unit 1 and the vector unit 2 can operate independently from each other. That is, after the scalar unit 1 delivers a vector instruction to the vector unit 2, the scalar unit 1 can process a next instruction.

The vector unit 2 comprises a large capacity of vector registers 21, which will be later explained in more detail, and mask registers 22 for storing mask data which determine whether or not each vector operation should be carried out. These mask registers 22 provide masked vector operations, i.e., conditional vector operations. The configuration of the mask registers 22 is similar to that of the vector registers 21. For example, when the vector registers 21 interleave eight ways, the mask registers 22 also interleave eight ways.

The vector unit 2 also comprises six pipelines: that is, an add operation pipeline 23, a multiply operation pipeline 24, an division operation pipeline 25, a mask pipeline 26, and two access pipelines, i.e., an A-access pipeline 27 and a B-access pipeline 28.

The operation registers 23, 24, and 25 interface with the vector registers 21 and the mask registers 22; the mask pipeline 26 interfaces with the mask registers 22 to perform an operation upon mask data; and the two access pipelines 27 and 28 of the same configuration interface with the main storage unit 4 via the memory control unit 3 and with the vector registers 21.

The vector unit 2 further comprises a vector instruction control unit 29 for controlling the elements 21 through 28.

The two access pipelines 27 and 28 enhance the load/store speed as compared with a single access pipeline. In addition, if the three operation pipelines 23, 24, and 25 can be operated simultaneously, the operating speed of the vector unit 2 also can be enhanced. In this case, however, only two of the operation pipelines 23, 24, and 25 can be operated simultaneously, due to the limitation of the interleaving multiplexity of the vector registers 21, which will be later explained.

Note that the present invention can be applied only to a vector data processing system which has at least two access pipelines.

The add operation pipeline 23 has a write bus 23-1, and two read buses 23-2 and 23-3 connected to the vector registers 21. That is, the add operation pipeline 23 receives two operands through the read buses 23-2 and 23-3 from the vector registers 21, and writes a result operand into the vector registers 21 through the write bus 23-1. Also, the add operation pipeline 23 has a bus for the mask registers 22, thereby writing a comparison result when receiving a compare instruction. Similarly, the multiply operation pipeline 24 has one write bus 24-1 and two read buses 24-2 and 24-3, and the division operation pipeline 25 has one write bus 25-1 and two read buses 25-2 and 25-3.

The A-access pipeline 27 has a write bus 27-1 and a read bus 27-2, and the B-access pipeline 28 has a write bus 28-1 and a read bus 28-2. According to the present invention, an additional read bus 28-3 is provided for carrying out indirect address instructions. Although the start point of this additional read bus 28-3 is provided on the side of the B-access pipeline 28, the end point of the additional read bus 28-3 is provided on the side of the A-access pipeline 27. Such an additional read bus 28-3 does not require an increase of the multiplexity of interleaves of the vector registers 21; which non-requirement is one of the most important features of the present invention.

In addition, provided between each of the access pipelines 27 and 28 and the mask registers 22 are a write bus and a read bus which are used for mask load/store instructions.

Figure 3:
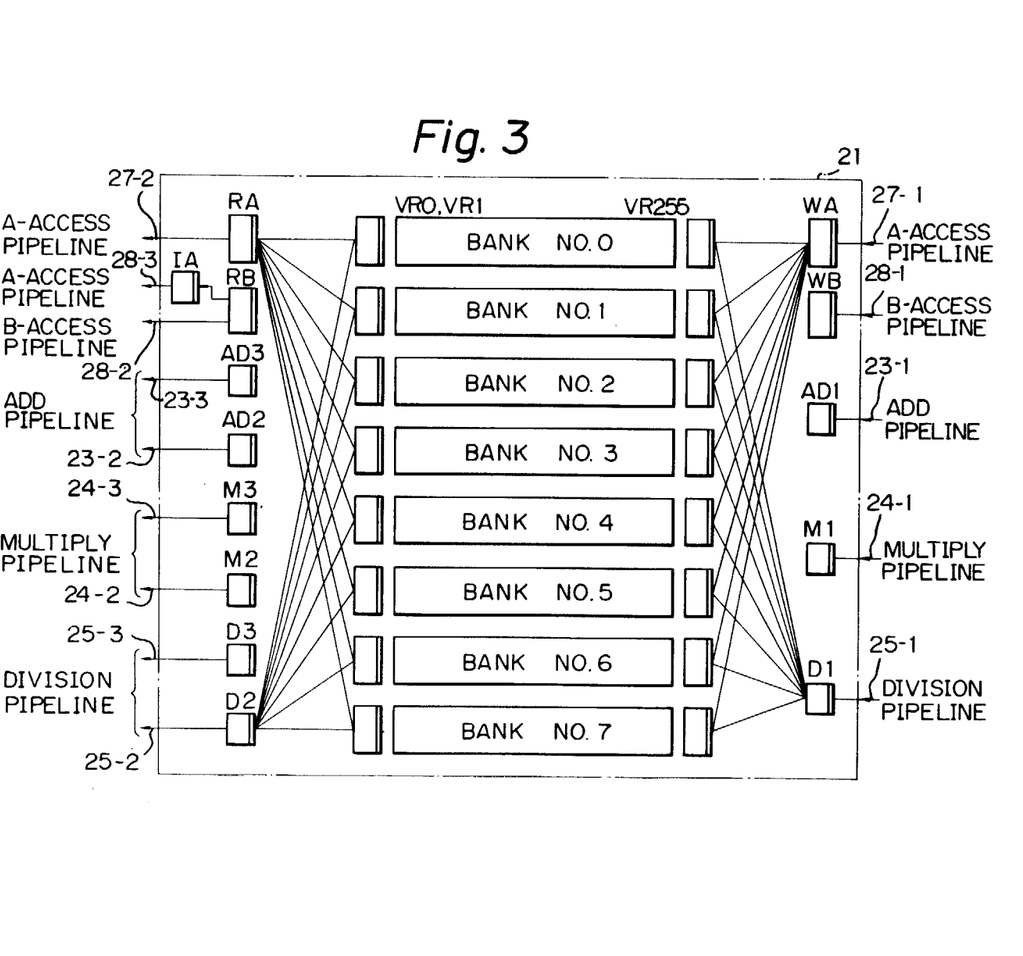
FIG. 3 is a detailed block diagram of the vector registers of FIG. 2.
Figure 4:
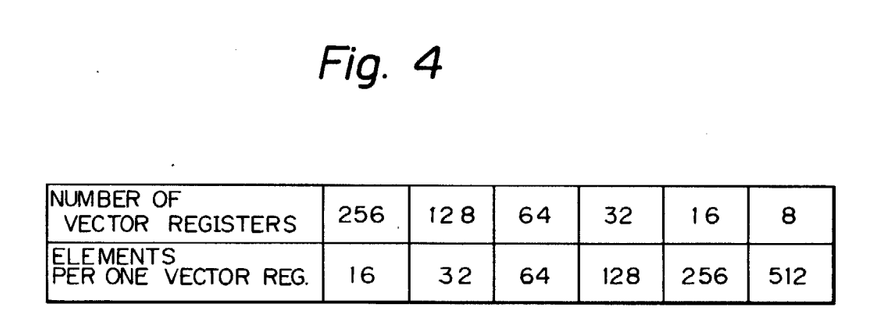
FIG. 4 is a diagram showing the relationship between the number of vector registers and elements per one vector register of FIG. 3.

In FIG. 3, which is a detailed block diagram of the vector registers 21 of FIG. 2, the vector registers 21 interleave eight ways. That is, the vector registers 21 are divided into eight banks NO. 0, NO. 1, ..., and NO. 7 which can be accessed independently. In addition, the number of vector registers is variable. Here, assume that the vector registers as a whole include 4,096 elements. In this case, as shown in FIG. 4, if the number of vector registers is 256, each of the vector registers VR0, VR1, ..., and VR255 includes 16 elements. Similarly, if the number of vector registers is 128, each of the vector registers VR0, VR1, ..., and VR127 includes 32 elements. The number of the vector registers is indicated by a vector length register (not shown) included in the vector instruction control unit 29.

Figure 5:
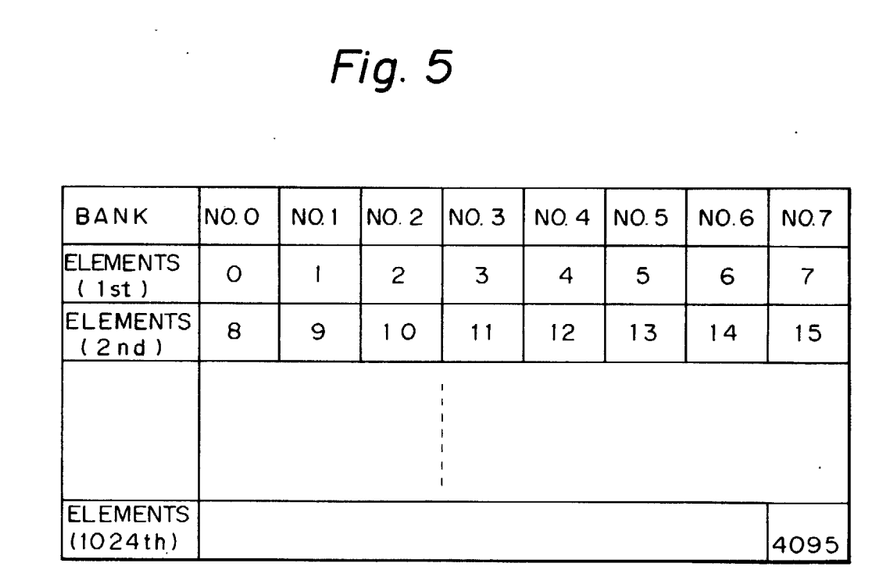
FIG. 5 is a diagram showing the elements allocated to the banks of FIG. 3.

In FIG. 3, two elements are allocated to each bank. That is, as shown in FIG. 5, among a first group of elements 0 to 15, elements 0 to 1, elements 2 and 3, ..., and elements 14 and 15 are allocated to banks NO. 0, NO. 1 ..., and NO. 7, respectively. Similarly, among a second group of elements 16 to 31, elements 16 and 17, elements 18 and 19, ..., and elements 30 and 31 are allocated to banks NO. 0, NO. 1 ..., and NO. 7, respectively. Thus, the banks are accessed independently by the pipelines, and two elements are processed by the pipelines.

The vector registers 21 are provided with write ports and read ports. That is, provided for the A-access pipeline 27 are a write port WA connected to the write bus 27-1 and a read port RA connected to the read bus 27-2. Provided for the B-access pipeline 28 are a write port WB connected to the write bus 28-1 and a read port RB connected to the read bus 28-2. Provided for the add operation pipeline 23 are a write port AD1 connected to the write bus 23-1 and two read ports AD2 and AD3 connected to the read buses 23-2 and 23-3, respectively. Provided for the multiply operation pipeline 24 are a write port M1 connected to the write bus 24-1 and two read ports M2 and M3 connected to the read buses 24-2 and 24-3, respectively. Provided for the division operation pipeline 25 are a write port D1 connected to the write bus 25-1 and two read ports D2 and D3 connected to the read buses 25-2 and 25-3, respectively.

Connected to the additional read bus 28-3 is a read port IA for indirect addresses which is also connected to the read port RB. That is, the read port IA is connected to one bank, only when the read port RB is connected to the one bank.

Figure 6:
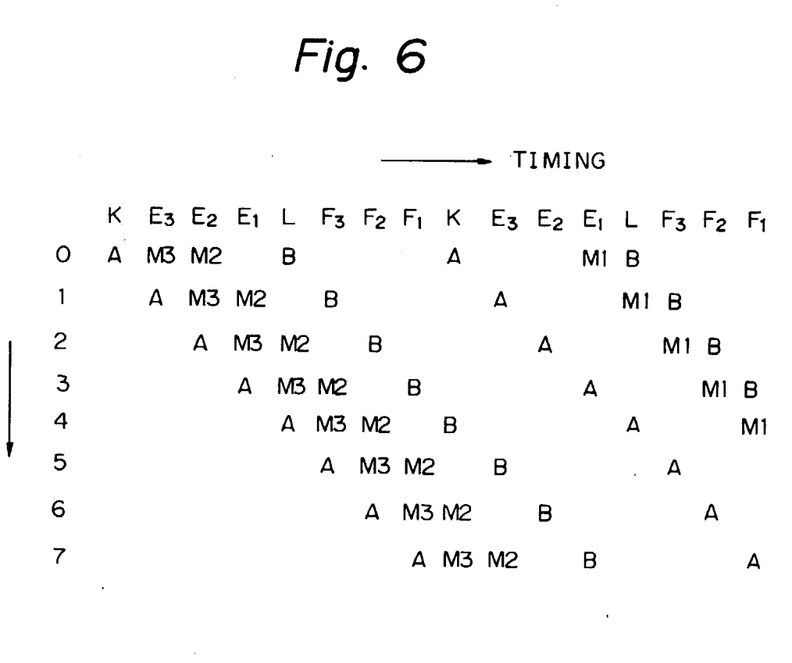
FIG. 6 is a timing diagram for explaining the operation of the vector registers of FIG. 3 for direct address instructions.

Since there are only eight banks, the maximum number of write/read ports to be connected to the banks is eight. In addition, since the first element of each vector register is always located at bank NO. 0, the operation of the banks is carried out at a fixed timing as shown in FIG. 6. That is, eight fixed cycles K, $E_3$, $E_2$, $E_1$, L, $F_3$, $F_2$, and $F_1$ are provided, and the sequence of cycles K, $E_3$, $E_2$, $E_1$, L, $F_3$, $F_2$, and $F_1$ is repeated. Only the access pipelines are allocated to cycles K and L, and only the operation pipelines are $E_3$, $E_2$, $E_1$, $F_3$, $F_2$, and $F_1$. Cycles $E_3$ and $F_3$ are used for the reading timing of a third operand, cycles $E_2$ and $F_2$ are used for the reading timing of a second operand, and cycles $E_1$ and $F_1$ are used for the writing timing of a first operand (result operand).

Therefore, both of the access pipelines 27 and 28 and two of the operation pipelines 23, 24, and 25 can access the banks simultaneously. Of course, if three more banks are provided, all of the operation pipelines 23, 24, and 25 may access the banks simultaneously. In addition, if one more bank is provided, the read port IR for indirect addresses can be connected directly to the banks. However, it should be noted that such increase of banks greatly increases the cost of the system.

According to the present invention, since the read port IA for indirect addresses is associated with the read port RB, it is unnecessary to increase the number of banks.

Figure 7:
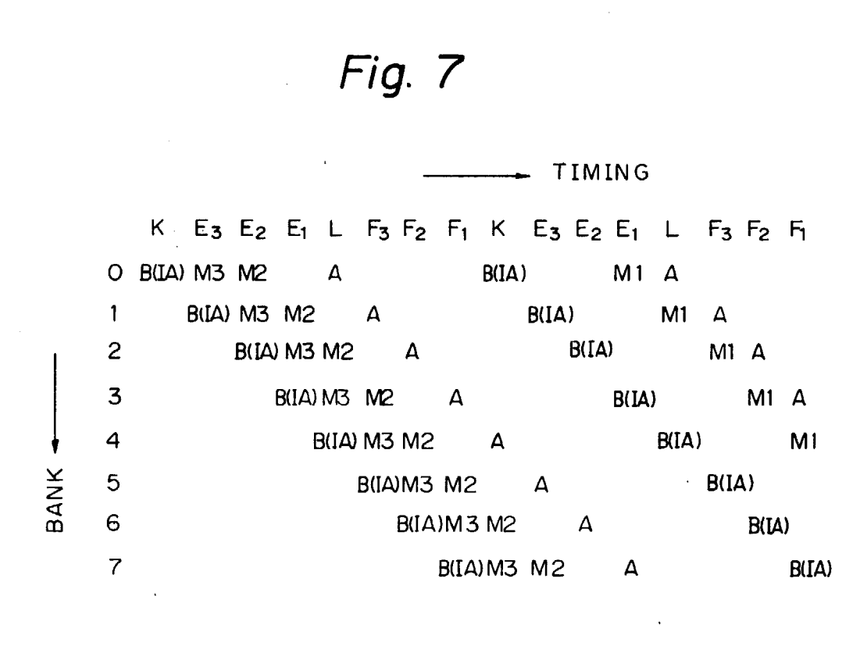
FIG. 7 is a timing diagram for explaining the operation of the vector registers of FIG. 3 for indirect address instructions.

In FIG. 3, indirect address load/store instructions are carried out on the side of the A-access pipeline 27. That is, load data is transmitted from the main storage unit 4 via the A-access pipeline 27, the write bus 27-1, and the write port WA to the vector registers 21, and load data is transmitted from the vector registers 21 via the read port RA, the read bus 27-2, and the A-access pipeline 27 to the main storage unit 4. In this case, operated on the side of B-access pipeline 28 is only the read port RB which is used for generating and transmitting indirect addresses via the read port IB to the read bus 28-3 which is connected to the A-access pipeline 27. That is, the B-access pipeline itself is not operated. As shown in FIG. 7, which illustrates the execution of an indirect address instruction, although the B-access pipeline 28 is allocated to cycle K, data does not pass through the B-access pipeline 28. In this case, the A-access pipeline 27 is allocated to cycle L, and as a result, data transmission is carried out only through the A-access pipeline 27. As stated above, indirect addresses are generated from the banks only via the read ports RB and IA on the side of the B-access pipeline 28, and are then transmitted to the A-access pipeline 27.

Figures 8, 8A:
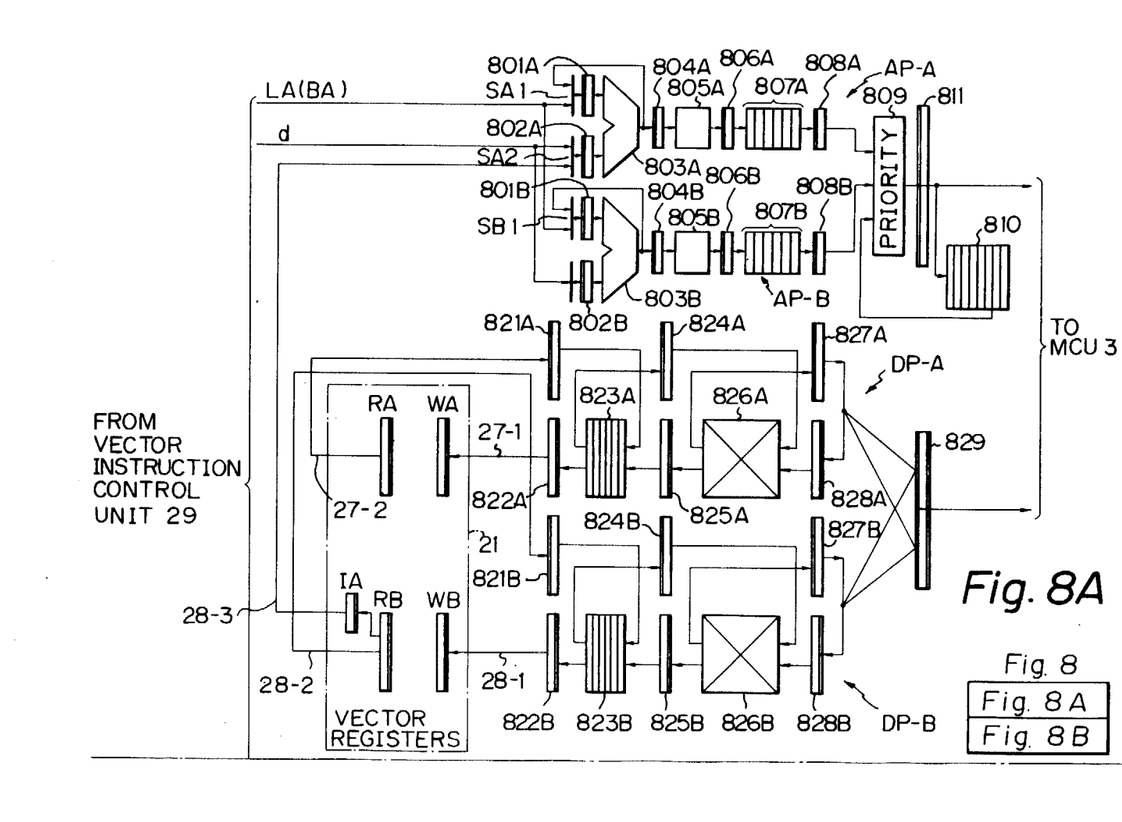
Figure 8B:
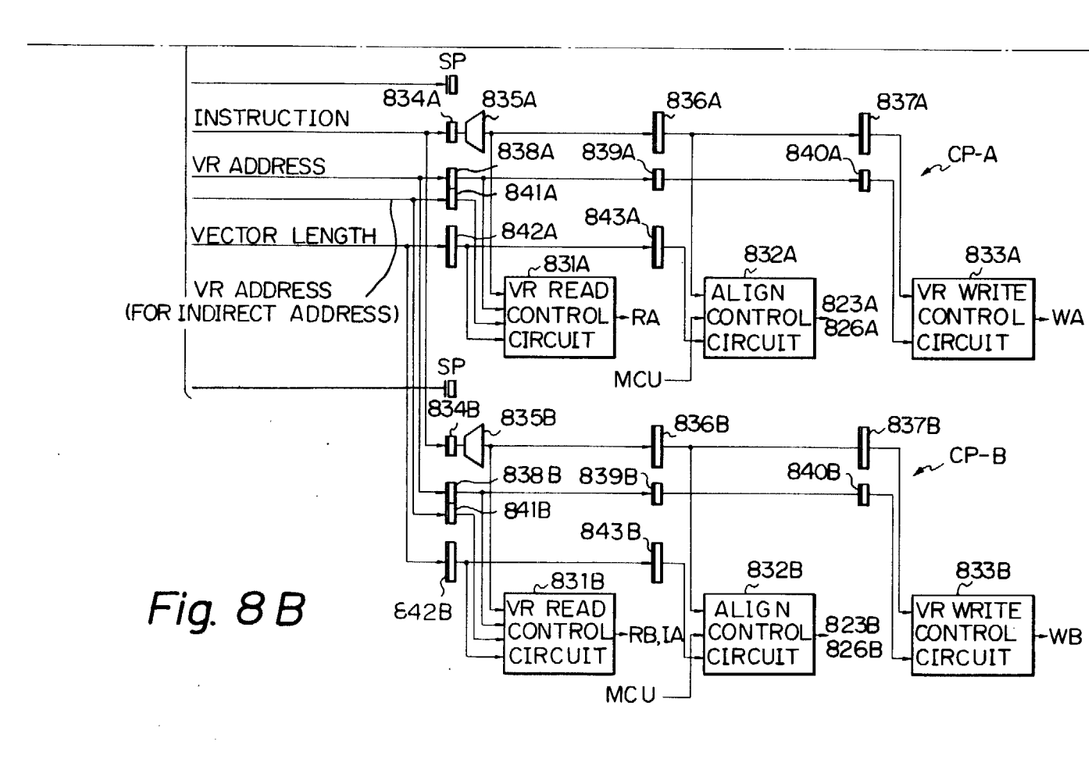

In FIG. 8, which is a detailed block diagram of the access pipelines of FIG. 2, two address pipelines AP-A and AP-B, data pipelines DP-A and DP-B, and control pipelines CP-A and CP-B are provided. In this case, the address pipeline AP-A, the data pipeline DP-A, and the control pipeline CP-A belong to the A-access pipeline 27, and the address pipeline AP-B, the data pipeline DP-B, and the control pipeline CP-B belong to the B-access pipeline 28.

In the address pipeline AP-A, based upon the values of registers 801A and 802A, an address adder 803A generates an address. The address of the address adder 803A is supplied via a register 804A to an address converter 805A which converts the address of the address adder 803A into a real address. The real address is supplied via a register 806A to an address buffer 807A which stores real addresses. The real addresses are supplied via a register 808A to a priority circuit 809. A selector SA1 selects a logical address LA from the vector instruction control unit 29 and the output of the address adder 803A and transmits it to the register 801A, and a selector SA2 selects distance information d from the vector instruction control unit 29 and an indirect address from the read port RA and transmits it to the register 802A. The selectors SA1 and SA2 are controlled by the vector instruction control unit 29.

The address pipeline AP-B has the same configuration as the address pipeline AP-A, except that no indirect addresses are supplied thereto.

The priority circuit 809 selects the real addresses of the registers 808A and 808B, and the real address of an address buffer 810 based upon the priority sequence thereof, and transmits it to a register 811 which has the same number of areas as the multiplexity of interleaves of the main storage unit 4. Note that the address buffer 810 is used for 8-byte partial store operations.

The data pipeline DP-A is comprised of registers 821A and 822A, a data buffer 823A, registers 824A and 825A, an align circuit 826A, and registers 827A and 828A. In this case, the data pipeline DP-A is bidirectional. That is, load data is transmitted from a register 829 via the register 828A, the align circuit 826A, the register 825A, the data buffer 823A, and the register 822A to the write port WA. Contrary to this, store data is transmitted from the read port RA via the register 821A, the data buffer 823A, the register 824A, the align circuit 826A, and the register 827A to the register 829.

Note that two successive elements of the vector registers 21 can be read simultaneously from the read port RA thereof to the data pipeline DP-A, while two successive elements can be written simultaneously from the data pipeline DP-A via the write port WA into the vector registers 21.

The data pipeline DP-B has the same configuration as the data pipeline DP-A.

The control pipeline CP-A comprises a vector read control circuit 831A for controlling the read port RA to provide store data, an align control circuit 832A for controlling the data buffer 823A, the align circuit 826A, and the other registers associated with the data buffer 823A and the align circuit 826A, and a vector write control circuit 833A for controlling the write port WA to write load data. An instruction code is supplied from the vector instruction control unit 29 via a register 834A to a decoder 835A which decodes the instruction codes. The decoded instruction information is supplied to the vector register read circuit 831A, also via a register 836A to the align control circuit 832A, and further via a register 837A to the vector register write control circuit 833A. A vector address is supplied from the vector instruction control unit 29 via a register 838A to the vector read control circuit 831A, also via a register 839A to the align control circuit 832A, and further via a register 840A to the vector register write control circuit 833A. A vector address for generating an indirect address is supplied from the vector instruction control unit 29 via a register 841A to the vector register read control circuit 831A. In this case, however, the vector register read control circuit 831A does not receive such a vector address. The control circuit 831A reads a vector address for compress/expand instructions via the register 841A. Vector length information is supplied from the vector instruction control circuit 29 via a register 842A to the vector register read control circuit 831A, also via a register 843A to the align control circuit 832A. Further, some control information is supplied from the memory control circuit 3 to the align control circuit 832A.

The control pipeline CP-B has the same configuration as the control pipeline CP-A, except that the vector register read control circuit 831B also controls the read port IA for generating indirect addresses, when the control circuit 831B receives a vector address for generating indirect addresses.

When the decoded instruction information indicates a direct address load instruction for the A-access pipeline 27, only the align control circuit 832A and the vector register write control circuit 833A are operated. That is, the align control circuit 832A reads the vector length information from the register 843A and the control information from the memory control circuit 3 to control the align circuit 826A, and the vector register write control circuit 833A reads the vector register address from the register 840A to control the write port WA. Thus, load operation by the A-access pipeline 27 is carried out. Similarly, when the decoded instruction information indicates a direct address load instruction for the B-access pipeline 28, only the align control circuit 832B and the vector register write control circuit 833B are operated.

In a direct address instruction mode, the vector instruction control unit 29 generates a logical address LA and a distance information d as well as the above-mentioned direct address load/store instruction. As a result, the address adder 803A or 803B adds the logical address LA to the distance information d and transmits it to the register 804A or 804B. Subsequently, the address adder 803A or 803B adds the addition result to the distance information d. Therefore, the address adder 803A or 803B generates the following sequence of addresses: LA, LA+d, LA+2d, . . . .

Note that the number of such addresses is defined by the vector length information.

When the decoded instruction information indicates a direct address store instruction for the A-access pipeline 27, only the vector register read control circuit 831A and the align control circuit 832A are operated. That is, the vector register read control circuit 831A reads the vector register address from the register 838A and the vector length information from the register 842A to control the read port RA, and the align control circuit 832A reads the vector length information from the register 843A and the control information from the memory control circuit 3 to control the align circuit 826A. Thus, store operation by the A-access pipeline 27 is carried out. Similarly, when the decoded instruction information indicates a direct address store instruction for the B-access pipeline 28, only the vector register read control circuit 831B and the align control circuit 832B are operated.

When the decoded instruction information indicates an indirect address load instruction, the vector register read control circuit 831B in addition to the align control circuit 832A and the vector register write control circuit 833A is operated. As a result, the vector register read control circuit 831B reads the vector register address for generating an indirect address from the register 837B and the vector length information from the register 838B to control the read port IA as well as the read port RB, thereby generating indirect addresses. Thus, load operation using such indirect addresses by the A-access pipeline 27 is carried out.

When the decoded instruction information indicates an indirect address store instruction, the vector register read control circuit 831B in addition to the vector register read control circuit 831A and the align control circuit 832A is operated. As a result, the vector register read control circuit 831B reads the vector register address for generating an indirect address from the register 837B and the vector length information from the register 838B to control the read port IA as well as the read port RB, thereby generating indirect addresses. Thus, store operation using such indirect addresses by the A-access pipeline 27 is carried out.

In an indirect address instruction mode, the indirect address generated from the read port IA is transmitted to the address adder 803A of the address pipeline AP-A. In this case, the vector instruction control unit 29 also generates a base address BA. Therefore, the address adder 803A adds the base address BA to the indirect address and transmits it to the register 804A. Subsequently, the address adder 803A adds the addition result to the indirect address. Therefore, the address adder 803A generates the following sequence of addresses: BA, BA+IA, BA+2IA, . . . , where IA is the indirect address. Also, note that the number of such addresses is defined by the vector length information.

In the above-mentioned embodiment, indirect address instructions are provided only for the A-access pipeline, since the indirect address generating read port IA is provided for the A-access pipeline. Of course, if such an indirect address generating read port is associated with the read port RA and is connected to the B-access pipeline 28, it is possible to perform indirect address instructions upon the B-access pipeline 28.

Figure 9:
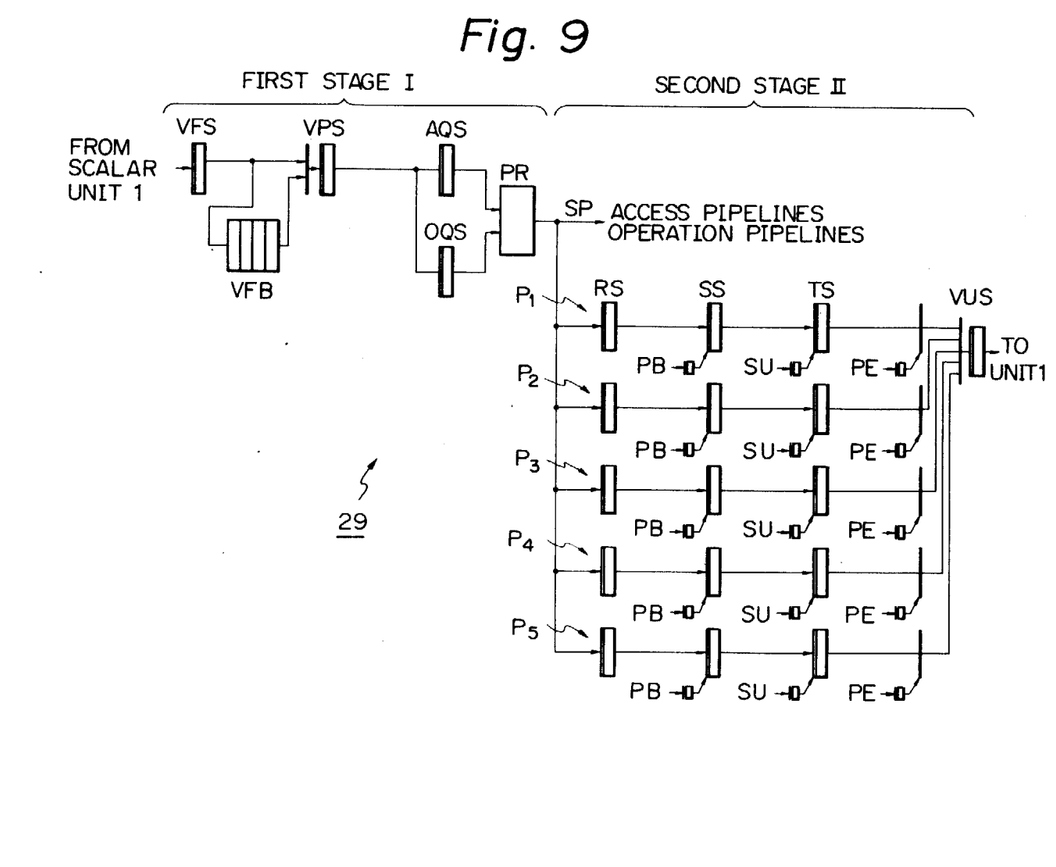
FIG. 9 is a detailed block diagram of the vector instruction control circuit of FIG. 2.

In FIG. 9, which is a detailed block diagram of the vector instruction control unit 29 of FIG. 2, the unit 29 comprises a first stage I for receiving and decoding vector instructions from the scalar unit 1 and a second stage II for controlling the pipelines 23, 24, 25, 26, 27, and 28.

The first stage I is comprised of a vector fetch stage VFS for receiving vector instructions, a vector fetch buffer VFB for stacking the received vector instructions, a vector predecoding stage VPS for predecoding the vector instructions of the vector fetch stage VFS and the vector fetch buffer VFB, an access queue stage AQS for holding and transmitting access instructions based upon the priority sequence thereof, an operation queue stage OQS for holding and transmitting operation instructions based upon the priority sequence thereof, and a priority circuit PR. This first stage I passes operation codes (instructions), vector register addresses or mask register addresses, and addresses or data therethrough and transmits them to the pipelines 23, 24, 25, 26, 27, and 28, thereby starting them.

The second stage II is comprised of five pipelines $P_1$, $P_2, \ldots, P_5$ for controlling the A-access pipeline 27, the B-access pipeline 28, the E-operation pipeline (i.e., cycles $E_3$, $E_2$, and $E_1$ of the operation of the vector registers 21), the F-operation pipeline (i.e., cycles $F_3$, $F_2$, and $F_1$ of the operation of the vector registers 21), and the mask pipeline 26. Each of the pipelines $P_1$, $P_2$, $P_3$, and $P_4$ comprises three stages; a read stage RS, a start up stage SS, and a terminate stage TS. The pipeline $P_5$ comprises a read stage RS and a terminate stage TS. These pipelines $P_1$, $P_2$, $P_3$, $P_4$, and $P_5$ pass operation codes (instructions) and register addresses therethrough, thereby assuring the sequence of the vector addresses for the conflict condition of the register addresses.

In FIG. 9, when vector load/store instructions are supplied from the scalar unit 1 to the vector instruction control unit 29, such vector load/store instructions are detected by the vector predecoding stage VPS and are transmitted to the access queue stage AQS. The transmission of the vector load/store instructions from the AQS stage to the second stage II is carried out so as to quarantee the sequence of operation between the vector registers 21 and the mask registers 22.

When at least one of the access pipelines 27 and 28 is unused, the access queue stage AQS can transmit a direct address load/store instruction to the pipeline $P_1$ or $P_2$. Note that the nonuse of the access pipeline 27 or 28 is found by determining whether or not the read stage RS thereof is empty, or by determining whether or not the pipe busy signal PB is "0". The pipe busy signal PB is generated from a gate (not shown) which receives a read signal out of the control circuit 831A or 831B and an address generating signal out of the address pipeline AP-A or AP-B.

Figure 10:
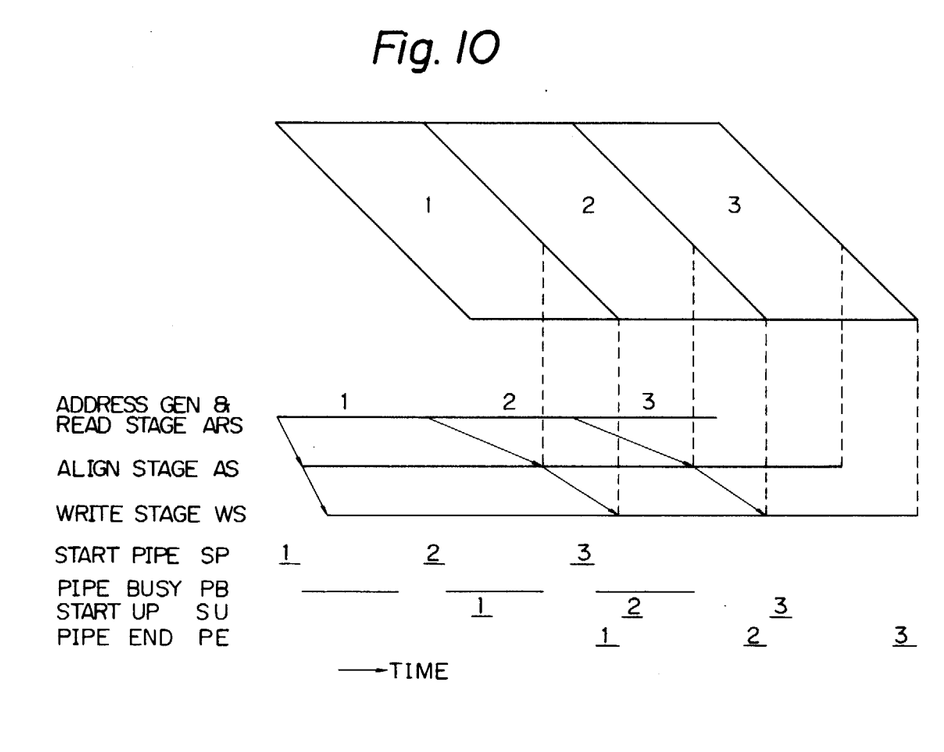
FIG. 10 is a timing diagram for explaining the operation of the A-access pipeline of FIG. 8.

The execution of a direct address load instruction will be explained with reference to FIG. 10. In such a load instruction, it takes a large number of cycles to receive the first element after the read stage RS receives the load instruction. As a result, three pieces of load instructions are carried out in such a manner that the execution of each of the three pieces of load instructions is overlapped. For this purpose, an address generating and read stage ARS, an align stage AS, and a write stage WS are prepared. (See: the pipelines CP-A and CP-B of FIG. 8). In FIG. 10, a start pipe signal SP from the first stage of FIG. 9 starts the stage, ARS for each load instruction. A pipe busy signal PB is generated from the address generating and read stage ARS. When the pipe busy signal PB is "1", the address generating and read stage ARS is busy, so that the address generating and read stage ARS cannot receive a next instruction. A start up signal SU is generated from the start up stage or align stage AS. The value "1" of the start up signal SU means that the first element is written into the vector register, and that the address generating and read stage ARS can read another piece of instruction. A pipe end signal PE is generated from the write stage WS. The pipe end signal PE resets the terminate stage TS of FIG. 9, thereby transmitting the content thereof to a vector unified stage VUS. The vector unified stage VUS supervises the end operation of each pipeline and transmits an interruption to the scalar unit 1 upon detection of it.

Figure 11:
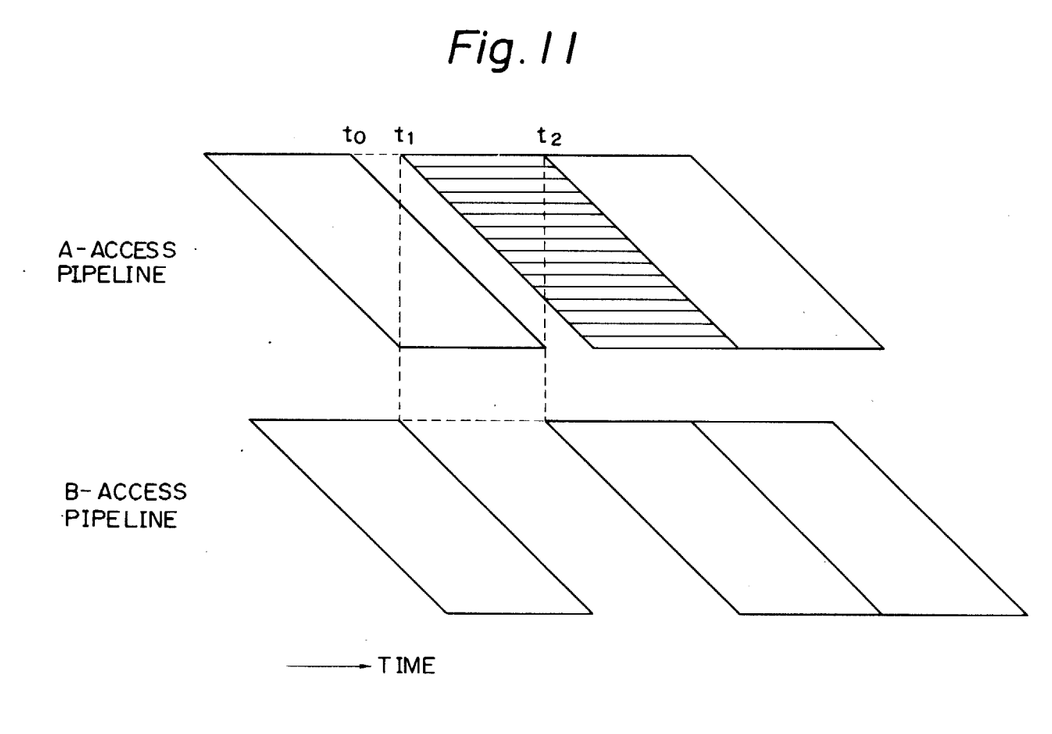
FIG. 11 is a timing diagram for explaining the operation of the A-access pipeline and the B-access pipeline of FIG. 8.

When both of the access pipelines 27 and 28 are unused, the access queue stage AQS can transmit an indirect address load/store instruction to the pipelines $P_1$ and $P_2$ via the priority circuit PR. Referring to FIG. 11, a shaded portion indicates an execution of an indirect address load/store instruction. That is, at time $t_0$, the access queue stage AQS receives an indirect address load/store instruction. The access queue stage AQS does not transmit this instruction to the read stage RS of the A-access pipeline, until the pipe busy signal of the B-access pipeline becomes "0". At time $t_1$, when the pipe busy signal of the B-access pipeline becomes "0" so that the operation of the read stage RS of the B-access pipeline moves to the operation of the start up stage thereof, the access queue stage AQS transmits the indirect address load/store instruction to the read stage RS of the A-access pipeline. In this indirect address load/store instruction mode, since only the read stage RS of the B-access pipeline is operated for generating an indirect address, the B-access pipeline can not be used. That is, from time $t_1$ to time $t_2$, the access queue stage AQS does not transmit any vector instruction to the read stage RS of the B-access pipeline. At time $t_2$, when the pipe busy signal of the A-access pipeline becomes "0", the access queue stage AQS transmits a direct address load/store instruction to the read stage RS of the B-access pipeline, if the access queue stage AQS has included such an instruction.

In the above-mentioned embodiment, only two access pipelines are provided. However, the present invention can be applied to a vector data processing system having more than three access pipelines. In this case, an additional read port may be provided for each pair of access pipelines.

As explained above, since an additional read port for generating indirect addresses for an access pipeline is connected to a read port of another access pipeline, it is unnecessary to increase the multiplexity of interleaves of the vector registers, i.e., to increase the number of ways of the vector registers, and thus the cost of the system can be kept low.

I claim:
1. A vector data processing system comprising:
 a main storage unit;
 a plurality of vector registers each including a plurality of elements for storing data, said vector registers further comprising a plurality of interleaved banks;

a plurality of access pipelines, linked between said main storage unit and said vector registers, for carrying out data transmission therebetween;

a plurality of write ports, each connected to one of said access pipelines and selectively to any one bank of said vector registers;

a plurality of read ports, each connected to one of said access pipelines, and selectively to any one bank of said vector registers;

an indirect address read port, linked between a first one of said access pipelines and the one of said read ports connected to a second one of said access pipelines; and control means, connected to said access pipelines, said main storage unit, said write ports, said read ports, and said indirect address read port, for transmitting an indirect address from said vector registers via said indirect address read port and said first access pipeline to said main storage unit and for transmitting data through said first access pipeline, when receiving an indirect address load/store instruction.

2. A system as set forth in claim 1, wherein said control means transmits load data from said main storage unit via said first access pipeline and one of said write ports to said vector registers, when said control means receives an indirect address load instruction.

3. A system as set forth in claim 1, wherein said control means trasmits store data from said vector registers via one of said read ports connected to said first access pipeline to said main storage unit, when said control means receives an indirect address store instruction.

4. A system as set forth in claim 1, wherein said first access pipeline comprises:
- a first address pipeline, connected to said control means and said indirect address read port;
- a first bidirectional data pipeline, connected to said first write port and said first read port; and
- a first control pipeline, connected to said control means, said first bidirectional data pipeline, said first write port, and said first read port, for controlling said first bidirectional data pipeline, said first write port, and said first read port, and wherein said second access pipeline comprises:

- a second address pipeline connected to said control means;
- a second bidirectional data pipeline, connected to said second write port, and said second read port; and
- a second control pipeline, connected to said control means, said second bidirectional data pipeline, said second write port, said second read port, and said indirect address read port, for controlling said second bidirectional data pipeline, said second write port, said second read port, and said indirect address read port.

5. A system as set forth in claim 4, wherein said first control pipeline comprises:
- a first address generating and read stage, connected to said control means, for receiving vector instructions and the like therefrom;
- a first align up stage, connected to said first address generating and read stage, said first data pipeline, and said first read port, for controlling said first data pipeline and said first read port; and
- a first write stage, connected to said first align stage and said first write port, for controlling said first write port, and wherein said second control pipeline comprises:
- a second address generating and read stage, connected to said control means, for receiving vector instructions and the like therefrom;
- a second align stage, connected to said second address generating and read stage, said second data pipeline, said second read port, and said indirect address read port, for controlling said second data pipeline said a second read port and said indirect address read port; and
- a second write stage connected to said second align stage and said second write port, for controlling said second write port.

6. A system as set forth in claim 5, wherein said control means comprises means for determining whether or not both of said first and second address generating and read stages are unused, thereby transmitting an indirect address load/store instruction thereto, only when both of said first and second address generating and read stages are unused.

* * * * *